United States Patent
Moazzami et al.

(10) Patent No.: US 11,631,236 B2
(45) Date of Patent: Apr. 18, 2023

(54) SYSTEM AND METHOD FOR DEEP LABELING

(71) Applicant: Samsung Electronics Co., Ltd., Gyeonggi-do (KR)

(72) Inventors: Mohammad Moazzami, San Jose, CA (US); Vijay Srinivasan, San Jose, CA (US); Anil Yadav, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1411 days.

(21) Appl. No.: 15/920,124

(22) Filed: Mar. 13, 2018

(65) Prior Publication Data
US 2018/0268244 A1  Sep. 20, 2018

Related U.S. Application Data

(60) Provisional application No. 62/471,000, filed on Mar. 14, 2017.

(51) Int. Cl.
| | |
|---|---|
| G06V 10/82 | (2022.01) |
| G06V 10/40 | (2022.01) |
| G06F 17/18 | (2006.01) |
| G06K 9/62 | (2022.01) |
| G06N 3/04 | (2023.01) |
| G06N 7/00 | (2023.01) |
| G06N 3/08 | (2023.01) |
| G06V 20/00 | (2022.01) |
| G06V 20/10 | (2022.01) |

(52) U.S. Cl.
CPC ............. *G06V 10/40* (2022.01); *G06F 17/18* (2013.01); *G06K 9/6256* (2013.01); *G06K 9/6267* (2013.01); *G06N 3/0454* (2013.01); *G06N 3/08* (2013.01); *G06N 7/005* (2013.01); *G06V 20/00* (2022.01); *G06V 20/176* (2022.01); *G06N 3/0481* (2013.01)

(58) Field of Classification Search
CPC ...... G06V 10/40; G06V 20/00; G06V 20/176; G06V 10/82; G06F 17/18; G06K 9/6256; G06K 9/6267; G06N 3/0454; G06N 3/08; G06N 7/005; G06N 3/0481
See application file for complete search history.

(56) References Cited

U.S. PATENT DOCUMENTS

| | | | |
|---|---|---|---|
| 7,020,593 B2 | 3/2006 | Hong et al. | |
| 8,059,864 B2 | 11/2011 | Huang et al. | |
| 9,672,445 B2 * | 6/2017 | Osindero | H04N 21/4828 |
| 9,710,729 B2 * | 7/2017 | Chidlovskii | G06K 9/6257 |

(Continued)

FOREIGN PATENT DOCUMENTS

WO  2017/203262 A2  11/2017

*Primary Examiner* — Philip P. Dang

(57) ABSTRACT

An apparatus for contextual execution comprises a processor, and a memory containing instructions, which when executed by the processor, cause the apparatus to receive, from a user terminal, a control input associated with an intent, obtain location data associated with a location of the user terminal, and determine a scored set of execution options associated with the control input. Further, the instructions, when executed by the processor cause the apparatus to obtain a contextual label associated with the location data, the label determined based on the application of one or more adapted pretrained deep learning models to the location data.

20 Claims, 12 Drawing Sheets

(56) References Cited

U.S. PATENT DOCUMENTS

| | | | |
|---|---|---|---|
| 9,753,949 B1* | 9/2017 | Malpani | G06V 10/768 |
| 9,754,188 B2* | 9/2017 | Mei | G06F 16/51 |
| 9,767,565 B2 | 9/2017 | Estrada et al. | |
| 9,786,270 B2* | 10/2017 | Senior | G10L 15/063 |
| 9,916,542 B2* | 3/2018 | Chidlovskii | G06K 9/6262 |
| 10,049,103 B2* | 8/2018 | Perez | G10L 25/30 |
| 10,152,557 B2* | 12/2018 | Banadaki | G06F 16/90 |
| 10,223,067 B2* | 3/2019 | Morris | G09B 21/00 |
| 10,289,909 B2* | 5/2019 | Baradel | G06K 9/6262 |
| 10,540,378 B1* | 1/2020 | Hsiao | G06F 16/532 |
| 10,649,970 B1* | 5/2020 | Saxe | G06F 16/2272 |
| 10,699,184 B2* | 6/2020 | Paluri | G06N 99/00 |
| 10,783,327 B2* | 9/2020 | Gordon | G06F 40/30 |
| 10,783,442 B1* | 9/2020 | Torkkola | G06N 3/0454 |
| 11,205,110 B2* | 12/2021 | Willson | G06F 40/242 |
| 2014/0278130 A1* | 9/2014 | Bowles | G16B 25/10 702/19 |
| 2015/0036889 A1* | 2/2015 | Ananda Yogendran | G16C 20/50 382/128 |
| 2015/0339591 A1* | 11/2015 | Cook | G06N 20/00 706/12 |
| 2016/0048741 A1* | 2/2016 | Nguyen | G06V 20/52 382/155 |
| 2016/0247501 A1 | 8/2016 | Kim et al. | |
| 2017/0289409 A1 | 10/2017 | Min et al. | |
| 2017/0316438 A1* | 11/2017 | Konig | G06Q 30/016 |
| 2017/0372220 A1* | 12/2017 | Krishnamurthy | G06N 7/005 |
| 2017/0372221 A1* | 12/2017 | Krishnamurthy | G06N 20/00 |
| 2018/0068231 A1* | 3/2018 | Sharma | G06N 20/00 |
| 2018/0137338 A1* | 5/2018 | Kraus | G06V 10/7753 |
| 2018/0211303 A1* | 7/2018 | Chatwin | G06N 20/00 |
| 2018/0260414 A1* | 9/2018 | Gordo Soldevila | G06F 16/583 |
| 2022/0035727 A1* | 2/2022 | Scott, II | G06F 11/3438 |

* cited by examiner

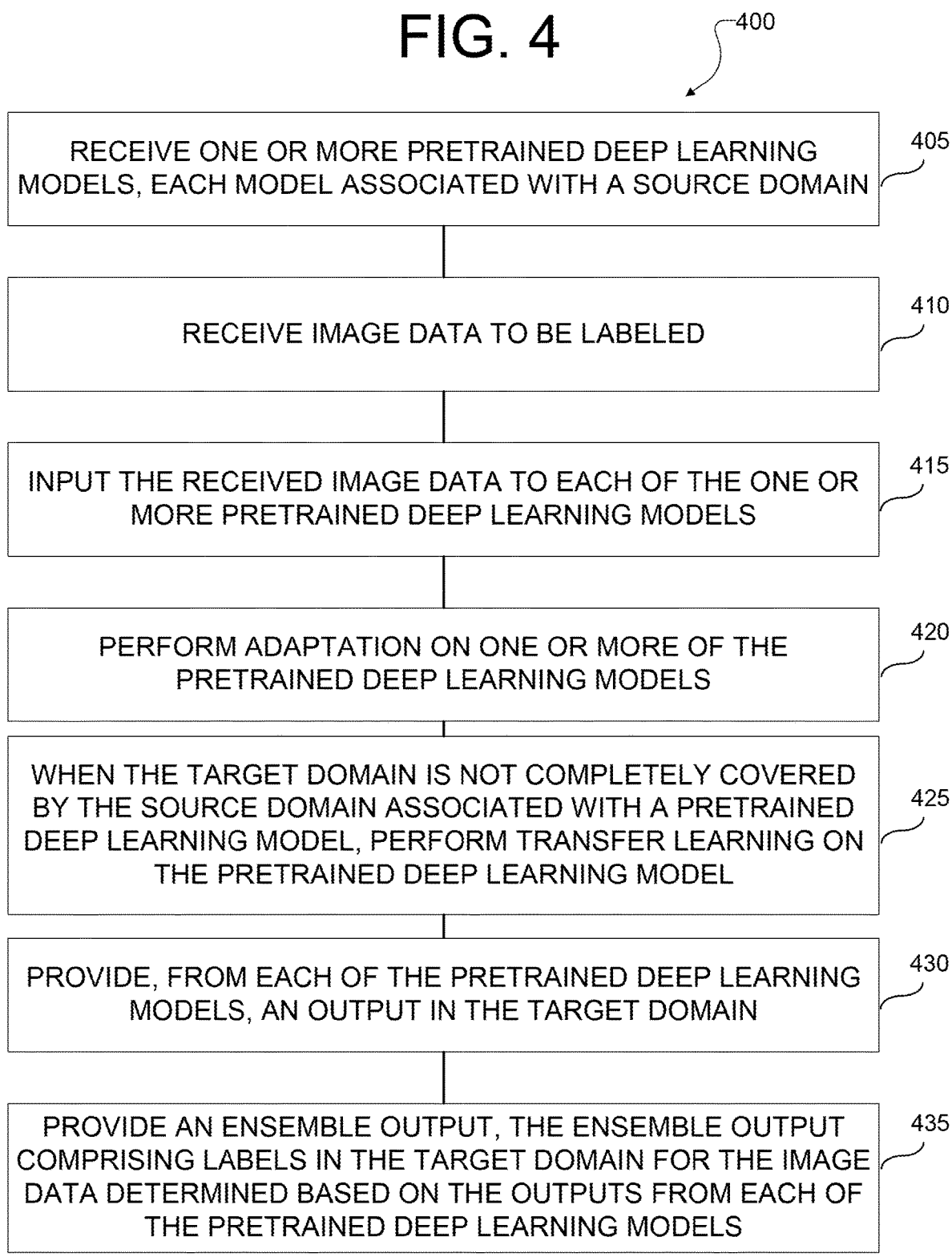

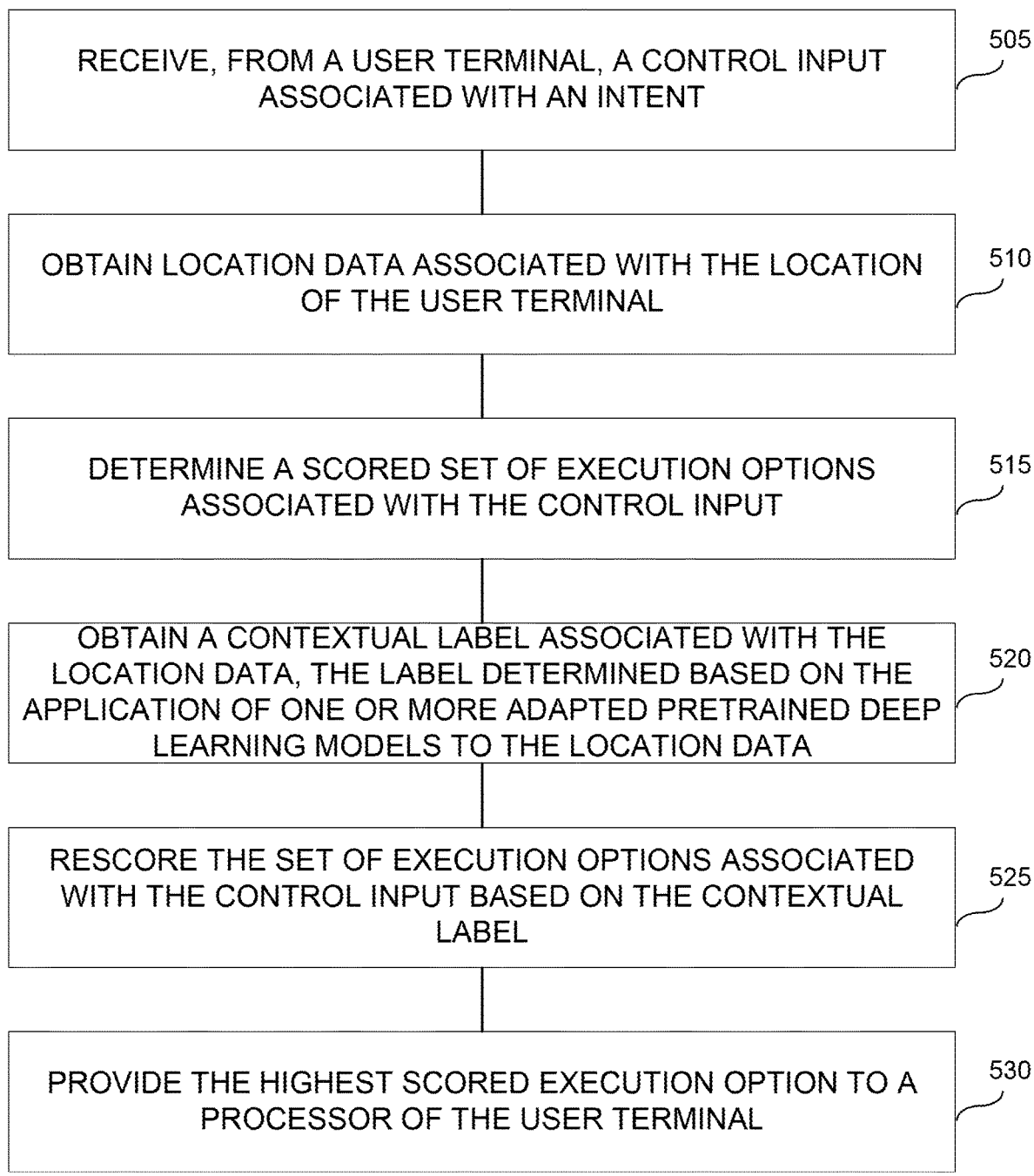

FIG. 6

| DNN MODEL | ARCHITECTURE | DATASET (# OF CLASSES / TOTAL SIZE) |
|---|---|---|
| MODEL 1 | 5(CV), 3(FC), 1000(O) | IMAGENET (1000 / 1.2m) |
| MODEL 2 | 5(CV), 3(FC), 205(O) | PLACES (205 / 2.5M) |
| MODEL 3 | 5(CV), 3(FC), 1183(O) | IMAGENET (978) + PLACES (205) |
| MODEL 4 | 59(CV), 5(FC), 205(O) | PLACES (205 / 2.5M) |
| MODEL 5 | 5(CV), 3(FC), 26(O) | PLACES 205 →SHOPS FROM PLACES + SUN397 DATASET (205 / 2.5M) |
| MODEL 6 | 5(CV), 3(FC), 67(O) | INDOOR 67 (67 / 15.6K) |
| MODEL 7 | 5(CV), 3(FC), 26(O) | IMAGENET → INDOOR SHOPS FROM SUN + PLACES → OWN DATA (15 / 1.5K) |
| MODEL 8 | 5(CV), 3(FC), 9(O) | IMAGENET → INDOOR SHOPS FROM IMAGENET (9/10K) |

FC: Fully-Connected Layer, CV: Convolution Layer, O: Output (number of classes)

→: Indicates the Direction of Transfer Learning: e.g., Base Model → New Model

FIG. 7A
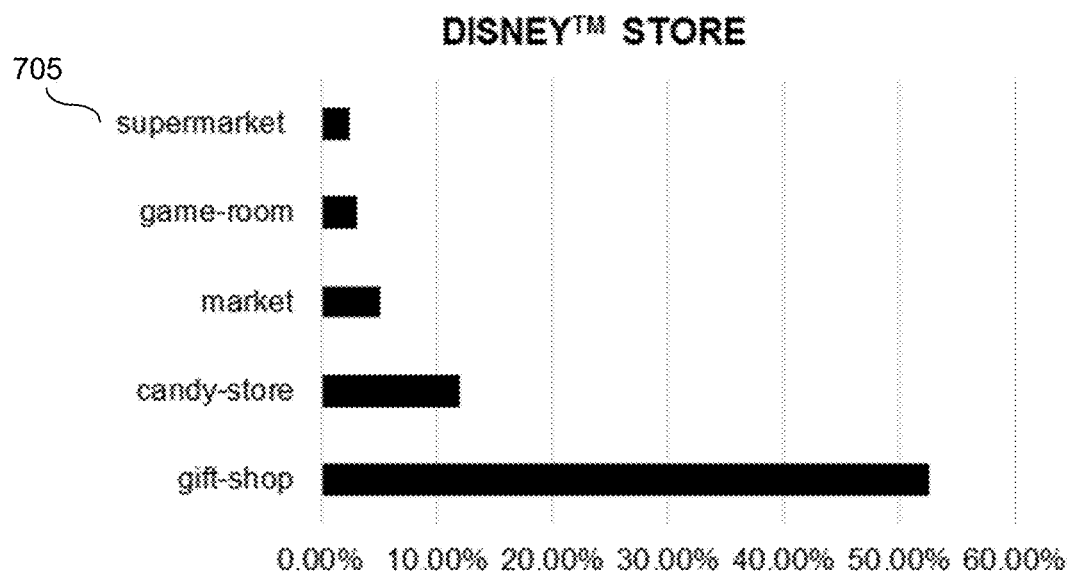
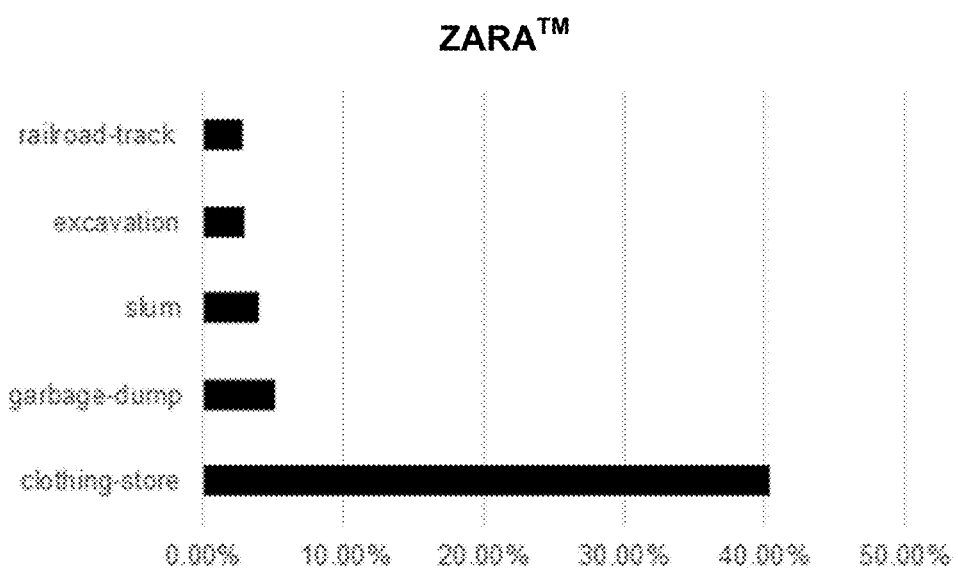

FIG. 7B
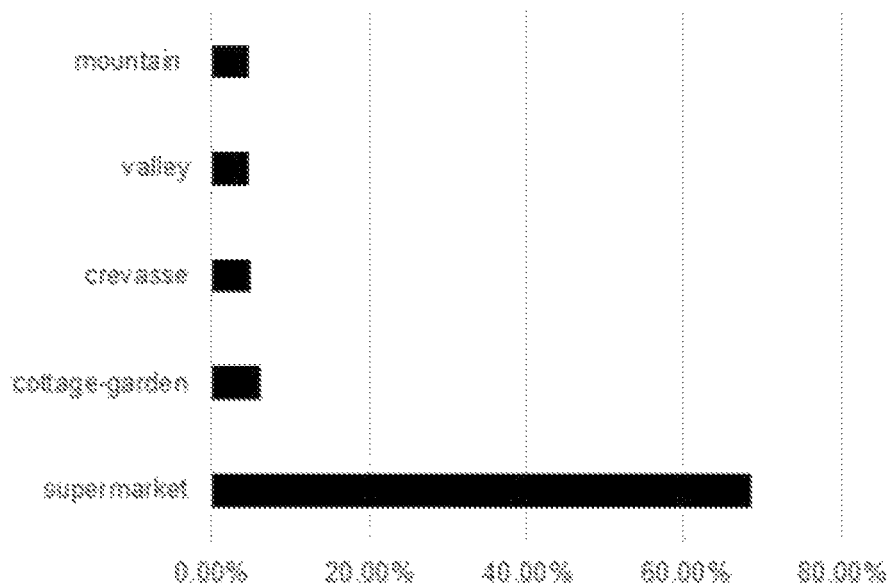
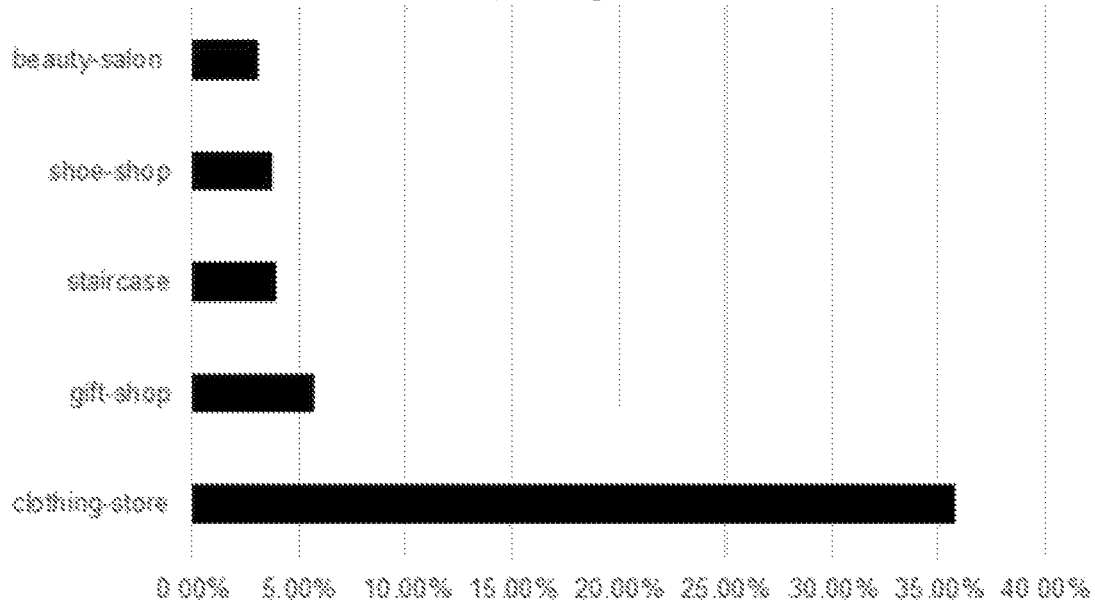

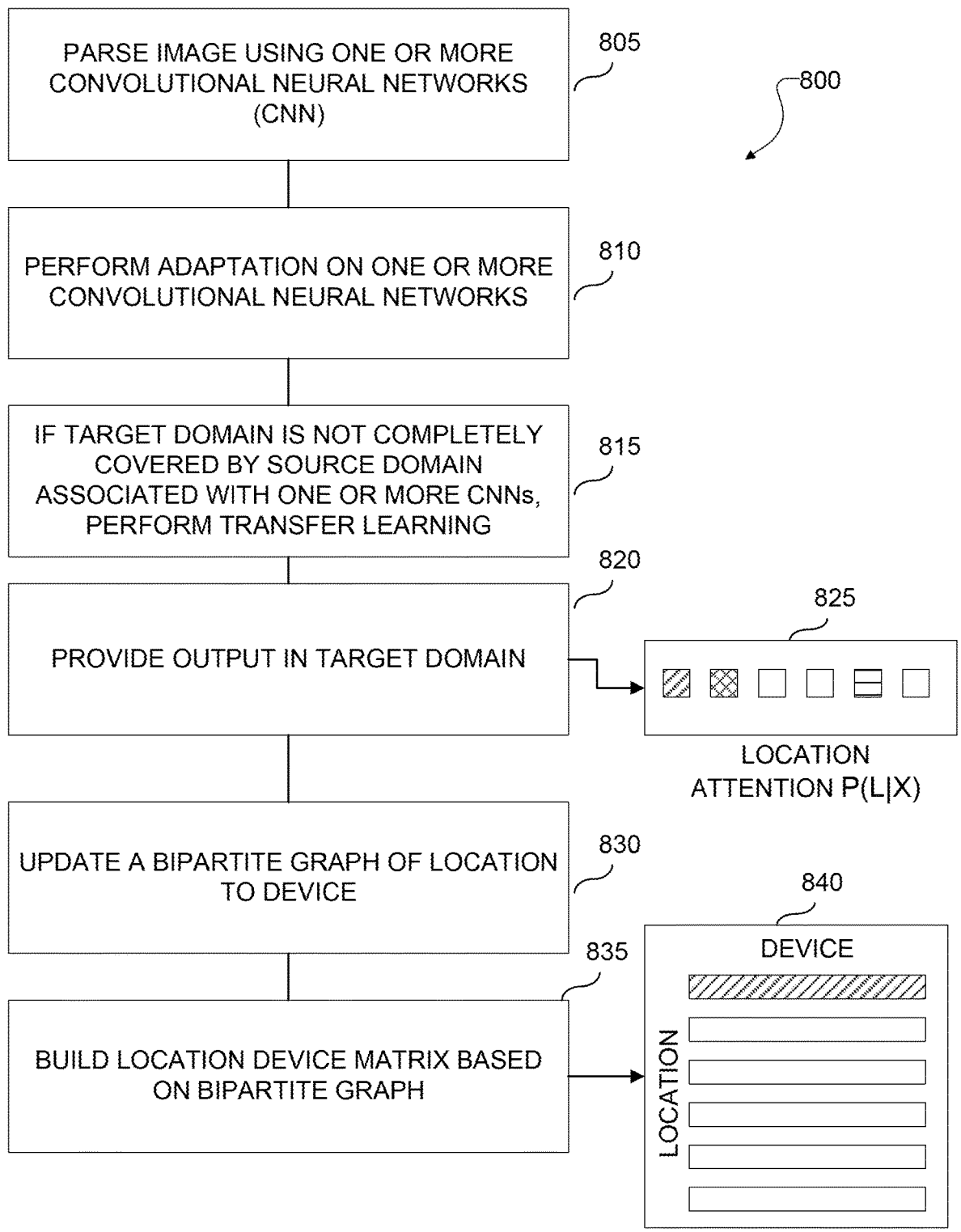

FIG. 9
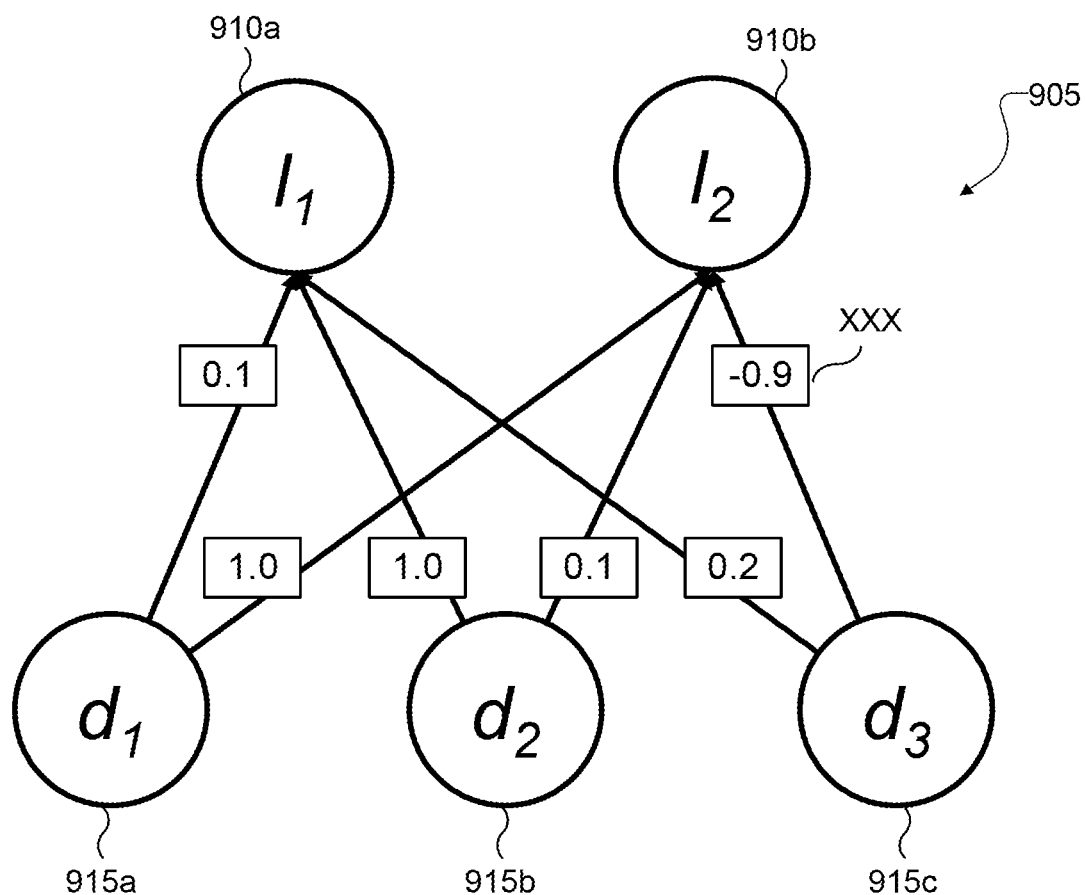
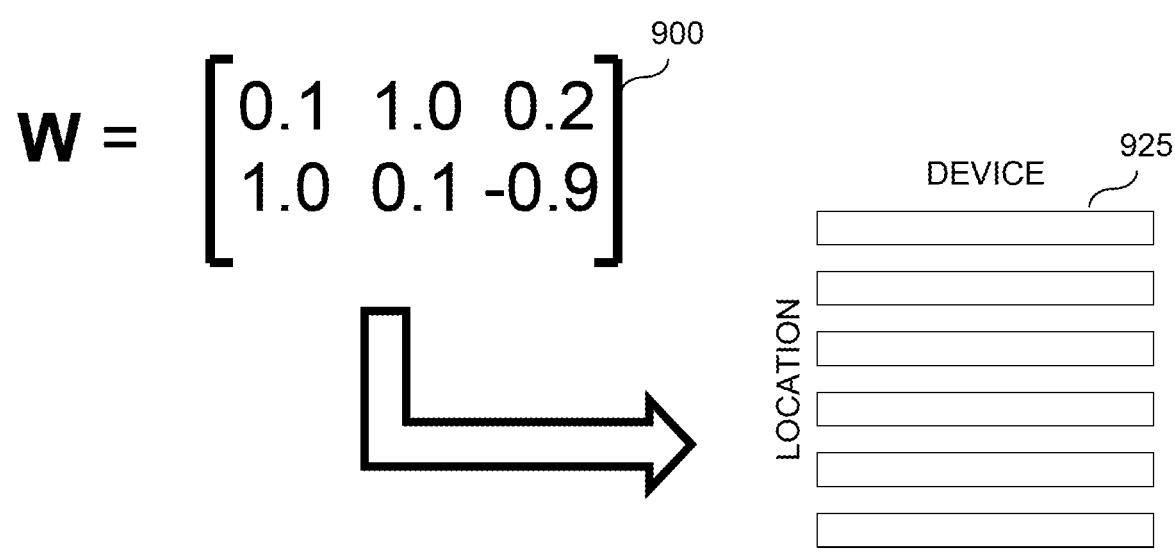

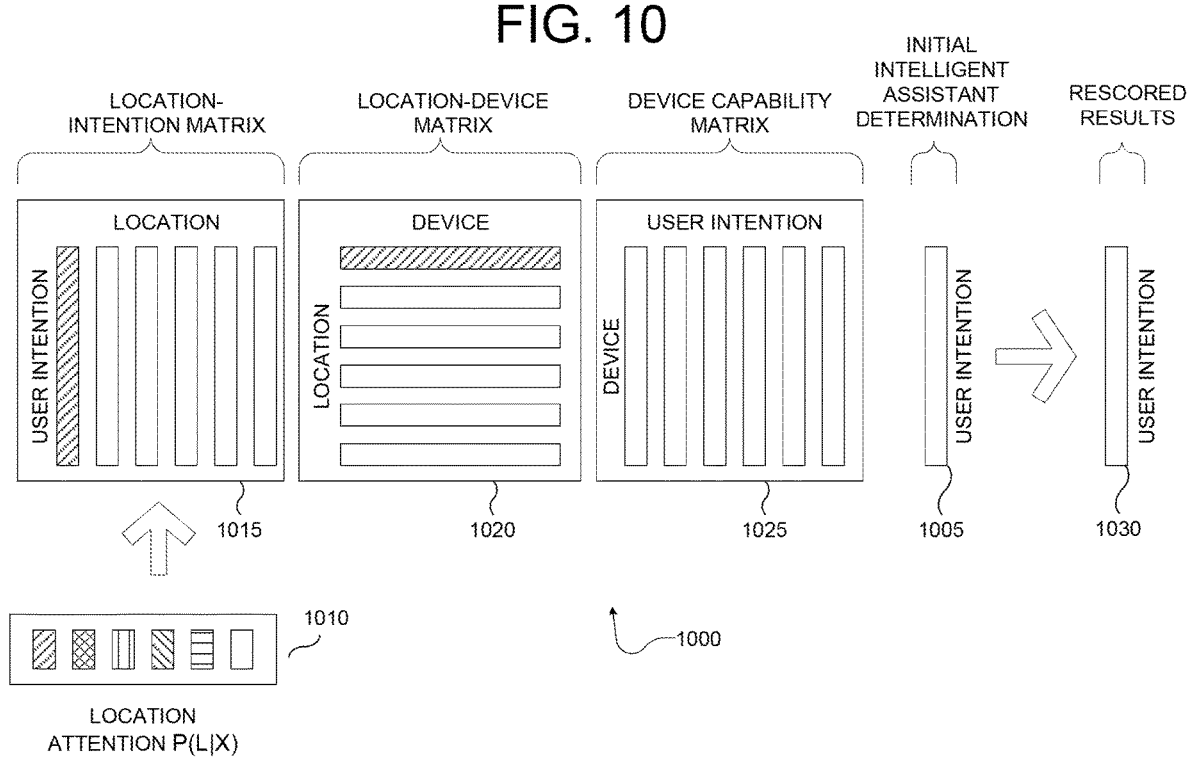

SYSTEM AND METHOD FOR DEEP LABELING

CROSS-REFERENCE TO RELATED APPLICATION AND CLAIM OF PRIORITY

This application claims priority under 35 U.S.C. § 119(e) to U.S. Provisional Patent Application No. 62/471,000 filed on Mar. 14, 2017. The above-identified provisional patent application is hereby incorporated by reference in its entirety.

TECHNICAL FIELD

This disclosure relates generally to improving the operation of computing platforms by providing contextual execution of control inputs associated with user intents. More specifically, this disclosure relates to deep-learning based crowd-assisted systems for contextual labeling, including, without limitation, systems for deep labeling.

BACKGROUND

Improved sensor technologies and machine-based voice and image recognition technologies provide important building blocks for future processor based apparatus which able to operate in response to user commands which, through their reliance intents and inferences, mimic the context-dependent ways in which humans communicate. However, the technical challenges associated with developing such contextually intelligent apparatus include, without limitation, developing corpuses of contextual labels associated with locations or other sources of context for user commands. For example, manual labelling of geographic data may be inadequate, given the sheer number of locations to be labelled and the limited accuracy of humans performing labelling. Further, the technical challenges associated with developing contextually intelligent apparatus include the fact that many machine learning techniques, such as deep neural networks (DNN), may require training on very large datasets. However, for many applications, a suitable dataset of sufficient size for training a DNN may not be available. Embodiments as disclosed and described herein are addressed to meeting these and other technical challenges associated with developing apparatus with contextual intelligence.

SUMMARY

This disclosure provides systems and methods for deep labeling.

In a first embodiment, an apparatus includes a processor and a memory containing instructions, which when executed by the processor, cause the apparatus to receive one or more pretrained deep learning models, each pretrained deep learning model associated with a source domain, receive image data to be labeled, and input the received image data to each of the one or more pretrained deep learning models. Further, the instructions, when executed by the processor, cause the processor to perform an adaptation on one or more of the pretrained deep learning models, provide, from each of the pretrained deep learning models, an output in a target domain, provide an ensemble output, the ensemble output comprising labels for the image data determined based on the outputs from each of the pretrained deep learning models, and when the target domain is not completely covered by the source domain associated with a pretrained deep learning model of the one or more pretrained deep learning models, perform transfer learning on the pretrained deep learning model.

In a second embodiment, a method for contextual labeling of image data includes receiving, one or more pretrained deep learning models, each pretrained deep learning model associated with a source domain, receiving image data to be labeled, and inputting the received image data to each of the one or more pretrained deep learning models. Additionally, the method includes performing an adaptation on one or more of the pretrained deep learning models, providing, from each of the pretrained deep learning models, an output in a target domain for the pretrained deep learning model, providing an ensemble output, the ensemble output comprising labels for the image data determined based on the outputs from each of the pretrained deep learning models, and when the target domain is not completely covered by the source domain associated with a pretrained deep learning model of the one or more pretrained deep learning models, perform transfer learning on the pretrained deep learning model.

In a third embodiment, a non-transitory computer-readable medium includes program code, which when executed by a processor, causes an apparatus to receive one or more pretrained deep learning models, each pretrained deep learning model associated with a source domain, receive image data to be labeled, and input the received image data to each of the one or more pretrained deep learning models. The program code, when executed by the processor, further causes the apparatus to perform an adaptation on one or more of the pretrained deep learning models, provide, from each of the pretrained deep learning models, an output in a target domain for the pretrained deep learning model, provide an ensemble output, the ensemble output comprising labels for the image data determined based on the outputs from the pretrained deep learning models, and when the target domain is not completely covered by the source domain associated with a pretrained deep learning model of the one or more pretrained deep learning models, perform transfer learning on the pretrained deep learning model.

In a fourth embodiment, an apparatus for contextual execution comprises a processor, and a memory containing instructions, which when executed by the processor, cause the apparatus to receive, from a user terminal, a control input associated with an intent, obtain location data associated with a location of the user terminal, and determine a scored set of execution options associated with the control input. Further, the instructions, when executed by the processor, cause the apparatus to obtain a contextual label associated with the location data, the label determined based on the application of one or more adapted pretrained deep learning models to the location data, rescore the set of execution options associated with the control input based on the contextual label, and provide the highest scored execution option to a processor of the user terminal.

In a fifth embodiment, a method for contextual execution includes receiving, from a user terminal, a control input associated with an intent, obtaining location data associated with a location of the user terminal, and determining a scored set of execution options associated with the control input. The method further includes obtaining a contextual label associated with the location data, the label determined based on the application of one or more adapted pretrained deep learning models to the location data, rescoring the set of execution options associated with the control input based on the contextual label and providing the highest scored execution option to a processor of the user terminal.

In a sixth embodiment, a non-transitory computer-readable medium includes program code, which when executed by a processor, causes an apparatus to receive, from a user terminal, a control input associated with an intent, obtain location data associated with a location of the user terminal, and determine a scored set of execution options associated with the control input. The program code, when executed by the processor, further causes the apparatus to obtain a contextual label associated with the location data, the label determined based on the application of one or more adapted pretrained deep learning models to the location data, rescore the set of execution options associated with the control input based on the contextual label, and provide the highest scored execution option to a processor of the user terminal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates operations of a method for performing adaptation of pretrained deep learning models to obtain an ensemble output according to this disclosure;

FIG. 5 illustrates operations of a method for performing a deep-learning based, crowd-assisted system for location labeling according to this disclosure;

FIG. 6 illustrates aspects of a pipeline of deep learning models for generating an ensemble output according to this disclosure;

FIGS. 7A-7C illustrate performance results of a test of an apparatus implementing the pipeline described in FIG. 6;

FIG. 8 illustrates operations of a method for generating a location-device matrix according to certain embodiments of this disclosure;

FIG. 9 illustrates aspects of building a location device matrix based on a bipartite graph according to certain embodiments of this disclosure; and FIG. 10 illustrates aspects of a method for rescoring execution options according to certain embodiments of this disclosure.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably configured processing platform.

Figure 1:
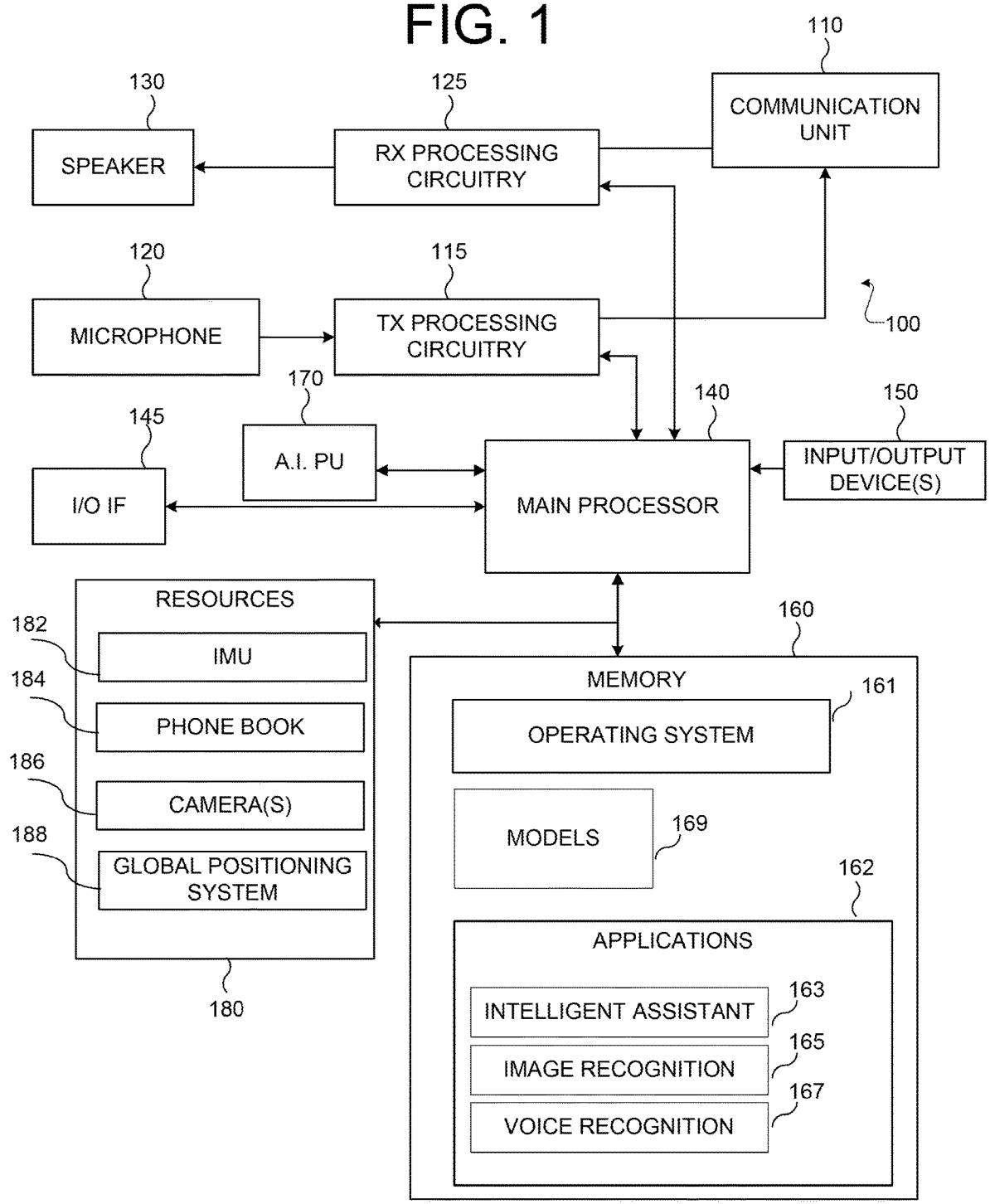
FIG. 1 illustrates an example of an apparatus according to this disclosure.

FIG. 1 illustrates one example of an apparatus 100 according to certain embodiments of this disclosure. The embodiment of apparatus 100 illustrated in FIG. 1 is for illustration only, and other configurations are possible. However, suitable devices come in a wide variety of configurations, and FIG. 1 does not limit the scope of this disclosure to any particular implementation of an apparatus.

As shown in FIG. 1, the apparatus 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The apparatus 100 also includes a speaker 130, a main processor 140, an input/output (I/O) interface (IF) 145, input/output device(s) 150, and a memory 160. The memory 160 includes an operating system (OS) program 161, one or more applications 162 and one or more models 169.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of apparatus 100, the resources of apparatus 100 including, without limitation, speaker 130, microphone 120, input/output devices 150, and additional resources 180. Further, applications 162 may include an intelligent assistant application 163, an image recognition application 165 and a voice recognition application 167. According to various embodiments, intelligent assistant application 163 operates as an orchestrator and execution manager for other applications 162 operating on apparatus 100. For example, intelligent assistant 163 may receive outputs (such as data or method calls) from voice recognition application 167 and forward them as inputs to another application, such as an internet browser or data service application (for example, a weather application). Thus, intelligent assistant 163 can, for example, orchestrate the apparatus' response to certain voice activated commands or requests, such as a user saying, "What's the weather?" or "Turn on living room lights."

The communication unit 110 may receive an incoming RF signal, for example, a near field communication signal such as a Bluetooth® or Wi-Fi® signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the apparatus 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

Additionally, in some embodiments operating system 161 is capable of providing "secure world" and "normal world" execution environments for applications 162.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of apparatus 100, or legacy applications developed for earlier platforms. The main processor 140 is also coupled to the I/O interface 145, which provides the apparatus 100 with the ability to connect to other devices such as laptop computers and handheld computers. The I/O interface 145 is the communication path between these accessories and the main processor 140.

The main processor 140 is also coupled to the input/output device(s) 150. The operator of the apparatus 100 can use the input/output device(s) 150 to enter data into the apparatus 100. Input/output device(s) 150 can include keyboards, touch screens, mouse(s), track balls or other devices capable of acting as a user interface to allow a user to interact with apparatus 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). In the non-limiting example of FIG. 1, memory 160 includes one or more models 169. In certain embodiments, models 169 comprise pretrained deep learning models, such as AlexNet. Depending on the storage capacity, processing power, and operational expectations (for example, battery life, operating temperature and so forth) of apparatus 100, models 162 may comprise lightweight versions of deep learning models.

Although FIG. 1 illustrates one example of an apparatus 100. Various changes can be made to FIG. 1. For example, according to certain embodiments, apparatus 100 can further include a separate artificial intelligence processing unit 170 (AI PU) or other processor adapted heavily multithreaded processing applications.

According to certain embodiments, apparatus 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of apparatus 100, and a global positioning system 188. In the non-limiting example of FIG. 1, additional resources 180 may operate to provide location data about a location (including, for example, GPS coordinates for the location, temperature information, altitude information, or other information which may be used as crowd-sensed input data for models 169. For example, resources 180 includes a calendar listing major holidays, and models 169 includes adapted pretrained deep learning models for recognizing features in image data and determining a contextual label (for example, a label assigning a class (e.g., "supermarket" or "shoe store" to the location where the image was captured). Calendar information indicating that an image was captured on Christmas Day (December 25) may be used to adjust the probabilities of labels assigned to an image with an abundance of the color red.

Although FIG. 1 illustrates one example of an apparatus 100 for implementing monitoring of suspicious application access, various changes may be made to FIG. 1. For example, the apparatus 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
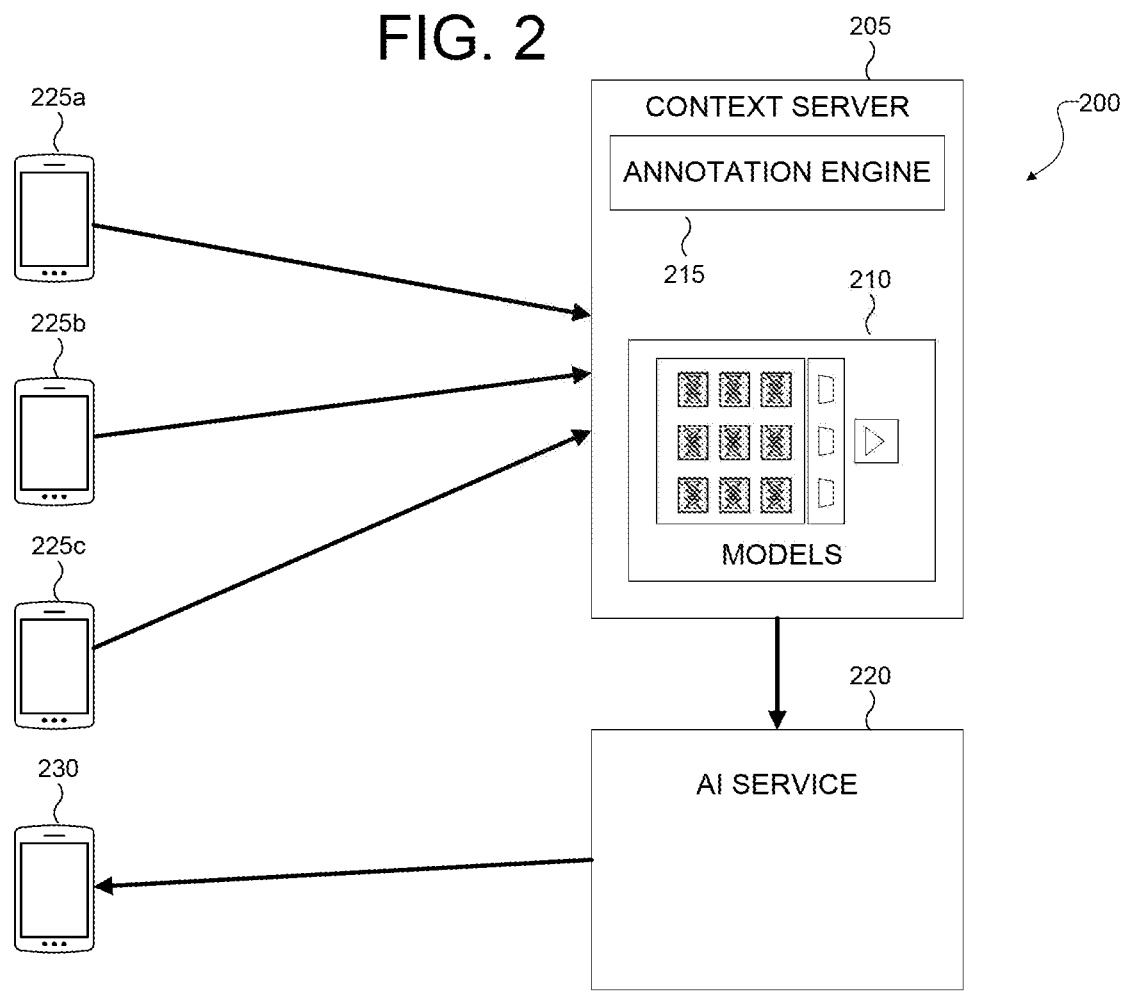
FIG. 2 illustrates an example of a network context for implementing a deep-learning based, crowd-assisted system for contextual labeling according to this disclosure.

FIG. 2 illustrates an example of a network context 200 for implementing a deep-learning based, crowd-assisted system for contextual labeling according to this disclosure.

According to various embodiments, network context 200 includes a context server 205, an artificial intelligence service server 220, a client device 230, and crowd-worker devices 225a, 225b and 225c.

In the non-limiting example of FIG. 2, context server 205 is a physical server computer comprising, at a minimum, a processor, a memory, and a network interface for connecting to crowd workers 225a-225c and AI service server 220. According to certain embodiments, context server 205 receives crowd-sensed data from crowd-workers 225a-225c. Crowd-sensed data comprises data from which contextual signals may be extracted and includes, without limitation, image data, video data, location data (for example, Global Positioning System data). As will be described in greater detail herein, in certain embodiments, context server 205 utilizes crowd-sensed data from crowd workers 225a-225c to train contextual labeling models (for example, models 210 in FIG. 2) implemented by context server 205. In other embodiments, context server 205 also uses crowd-sensed data to build a corpus of contextual label data associated with locations in which crowd workers 225a-225c are deployed. As a non-limiting example, context server 205 can build a database associating geographic locations (or GPS coordinates) with contextual labels using image data from the geographic locations provided by 225a-225c.

Additionally, in certain embodiments, context server 205 can crowd-source the implementation of models (for example, models 210 in FIG. 2) to generate predictions as to a contextual label to be assigned to a location. In certain embodiments, each crowd worker's prediction is received at context server 205, and the crowd workers' contextual label predictions are aggregated at context server 205.

According to various embodiments, context server 205 runs models 210 as an analytical adjunct to an artificial intelligence (AI) service provided by a third party (for example, a service provided by AI service server 220). In the non-limiting example of FIG. 2, models 210 are deep neural networks embodying a three layer schema, comprising a model layer, an adaptation layer and an ensemble output layer. In certain embodiments, models 210 output probabilistic determinations that a given contextual label is associated with received image data.

In some embodiments, annotation engine 215 acts as an ingestion pipeline for aggregating crowd-sourced predictions of labels to be assigned to images from a particular location.

In the non-limiting example of FIG. 2, AI service server 220 implements or supports an artificial intelligence service. Examples of artificial intelligence services include, without limitation, intelligent assistant applications, such as Bixby™, Alexa™, or Siri™, which can, in some instances, apply artificial intelligence to parse and process user requests, including, for example, verbal utterances recorded at a smartphone.

In certain embodiments, crowd workers 225a-225c are apparatus (for example, apparatus 100 in FIG. 1) including processor, memory, send and receive circuitry and one or more sensors capable of obtaining information (for example, image data, GPS coordinates, Wi-Fi network identities, etc.) which can be input into models 210. Examples of devices which can operate as crowd workers 225a-225c include, without limitation, smartphones, tablets, smartwatches and laptop computers.

According to various embodiments, network context 200 includes a client device 230. In the non-limiting example of FIG. 2, client device 230 is a device which passes a user command and, for example, location data (for example, a verbal request to the client device "Show me my tickets") to AI service server 220. Applying contextual labels associated with the location data determined by models 210 (for example, a contextual label matching client device 230's location to an airport), AI service server 230 provides client device 230 with a probabilistically determined execution option. In this case, execution options include, without limitation, opening an air travel application to show the user a plane ticket, or opening a digital wallet application containing a plane ticket.

In certain embodiments, client device 230 may also be a client worker.

Although FIG. 2 illustrates one example of a of a network context 200 for implementing a deep-learning based, crowd-assisted system for contextual labeling according to this disclosure, various changes may be made to FIG. 2. For example, while network context 200 has been described with respect to embodiments which perform contextual location labeling based on image data, the disclosure as a whole is not so limited. Location is merely one example of a useful contextual signal for human-centric applications executing on apparatus according to this disclosure. Similarly, image data is merely one example of a source of data from which contextual labels may be determined according to embodiments of this disclosure. Other embodiments, using different sources of data and contextual labels are possible and within the intended scope of this disclosure. For example, some embodiments may determine context from text in crowd sourced pictures and posts in social networks to infer business names. Other embodiments may attempt to contextually categorize locations by training models on Wi-Fi or GSM data. Still other embodiments may apply contextual labels (for example, "action movie fan") based on models applied to content in a person's social media feed.

Similarly, while FIG. 2 describes an embodiment employing a client-server network architecture, the present disclosure is not so limited and embodiments according to this disclosure are generally platform-agnostic and may be implemented on a variety of scales and across different network architectures. In some embodiments, contextual labeling according to this disclosure may be performed on a single device, or in some embodiments, on a single chip. Similarly, in certain embodiments, elements shown in the illustrative example of FIG. 2 may be added or subtracted. For example, in various embodiments, the separate AI service server 220 is omitted. In other embodiments, the AI service may be provided through context server 205.

Figure 3:
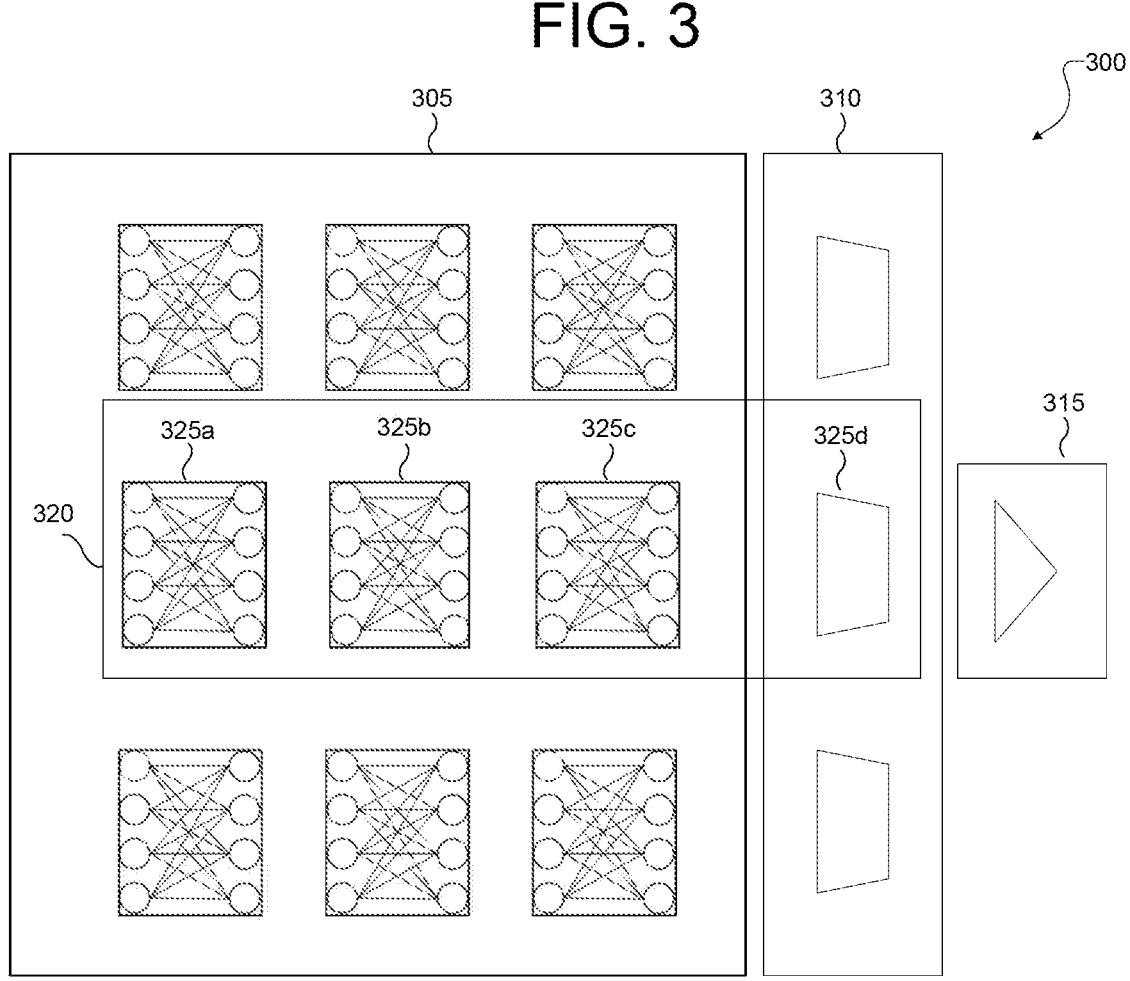
FIG. 3 illustrates an example of a pipeline which includes a model adaptation schema and ensemble of adapted models according to this disclosure.

FIG. 3 illustrates an example of a three-layer processing pipeline 300 which includes a model adaptation schema and ensemble of adapted models according to this disclosure. As shown in FIG. 3, certain embodiments according to this disclosure implement a three-pipeline for determining contextual classifiers for received data.

In the non-limiting example of FIG. 3, a three-layer pipeline 300 for determining contextual location data from visual data. A first layer 305 comprises a set of pre-trained deep learning, or deep neural network (DNN) models. A second layer 310 comprises a model adaptation layer. A third layer 315 comprises an ensemble output layer.

According to various embodiments, first layer 305 comprises one or more pretrained deep learning models 320. Further, in the non-limiting example of FIG. 2, pretrained deep learning model 320 includes multiple layers, which include a first layer 325a, intermediate layers 325b and 325c, and last layer 325d. In some embodiments, for example, embodiments where no changes to the operation of the model are made, last layer 325d may be considered part of first layer 305. In other embodiments, last layer 325d may be considered part of second layer 310. The distinction between layers of pipeline 300 is to facilitate explanation, and should not be interpreted as limitative of the scope of this disclosure.

As will be discussed in greater detail herein, last layer 325d can be a "loss layer" or a layer implementing a SoftMax classifier. Layers 325a through 325d can also include, without limitation, pooling layers, fully-connected layers and convolution layers.

In the non-limiting example of FIG. 3, deep learning model 320 is pre-trained to implement operations at each of layers 325a through 325d to recognize learned deep features found in a data set, represent the deep features with a feature vector and output probabilistic predictions of specific classes of a model-specific domain being associated with the recognized deep features. Examples of DNN models which may be implemented as pretrained deep learning model 320 include, without limitation, the AlexNet and Inception-V3 models.

According to certain embodiments, deep learning model 320 is pre-trained on a dataset specifically developed for an contextual labeling application (for example, determining contextual labels from image data). However, sufficiently training a deep neural network to avoid overfitting frequently requires very large datasets and it may be impractical to develop a dataset for training an entire deep neural network from scratch. Accordingly, in some other embodiments, it may be desirable to instead pre-train deep learning model 320 on a very large standard dataset (for example, ImageNet, which contains 1.2 million images with 1000 categories, or the Places dataset, which contains 500,000 images with 205 categories) and use resulting model either as an initialization or a fixed feature extractor to build a final model. According to still other embodiments, deep learning model is trained on a dataset generated by crowd worker devices (for example, crowd workers 225a-225c in FIG. 2).

In some embodiments according to this disclosure, second layer 310 comprises an adaptation layer.

According to some embodiments, the classifiers for each deep learning model in first layer 305 belong to a problem space (also referred to as a "source domain") specific to the model. Depending on embodiments, the source domains of the pre-trained models in first layer 305 may define a different classifier space to the space defined by the contextual labels to be output by pipeline 300 (also referred to as a "target domain"). For example, first layer 305 may include a pre-trained deep learning model which outputs 1000 class labels, of which, only some arbitrary subset are applicable to identifying a context of interest (for example, a location). In such cases, model adaptation layer 310 adapts the classifier space of the deep learning model to the target domain.

According to certain embodiments, domain adaptation comprises label space adaptation, wherein the output of the final layer of a pretrained deep learning model (for example, final layer 325d shown in FIG. 3) is adapted without tuning learned parameters (weights) assigned to feature vectors or altering the internal structure of the model.

According to one non-limiting example, final layer 325d of pretrained deep learning model 320 implements a SoftMax classifier. The operation of final layer 325d can, according to certain embodiments, be represented by the following loss function:

$$P(y = j \mid X_i) = \frac{e^{w_j X_i^T}}{\sum_{k=1}^{n} e^{(w_k X_i^T)}}$$

In the equation above, $X_i$ is the feature vector extracted by the deep neural network for the input sample i (captured single image). $W_i$ is the weight learned by the neural network. y is the predicted class label in $j \in \mathbb{N}$ the set of all the class labels a pre-trained model is trained on (the source domain).

In the non-limiting example of FIG. 3, the output of the SoftMax classifier can be adapted for a task of interest, including assigning contextual labels in a target domain by following the Bayesian chain rule as shown below.

$$P_s(y = j \mid X_i) = \frac{1(y \in \mathbb{L}) \cdot P(y = j \mid X_i)}{\sum_{\mathbb{L}} 1(y \in \mathbb{L}) \cdot P(y = j \mid X_i)}$$

As shown above, $1(\cdot)$ is the identity function and $\mathbb{L}$ is the label-set of the application the pre-trained model is adopted for (the target domain). The denominator is the normalization factor and thus $P_s(y=j \mid X_i)$ indicates the probability of class (label) given the feature vector $X_i$ for application specific labels $j \in \mathbb{L}$. Thus, for a pre-trained model $\mathbb{M}$ with the label space $\mathbb{N}$ in the source domain, the above approach the model $\mathbb{M}$ for the target application with label space $\mathbb{L} \subset \mathbb{N}$.

According to some other embodiments, the differences between the space of the source domain and the target domain are such that model adaptation following the Bayesian chain rule may not be possible. Examples of such embodiments include embodiments where the target domain comprises a subset of the source domain (e.g., where $\mathbb{L} \subset \mathbb{N}$). One example of embodiments where $\mathbb{L} \subset \mathbb{N}$ is the case where there are class labels in $\mathbb{L}$ which do not have any representation is the source domain (for example, where the label "computer store" is in the space $\mathbb{L}$ of the target domain, but there is no corresponding label for "computer store" in the source domain). A further, example an embodiment where $\mathbb{L} \subset \mathbb{N}$ includes instances where there are class labels in the space $\mathbb{L}$ of the target domain which match with multiple class labels in the source domain. For example, in some embodiments, $\mathbb{L}$ includes the contextual location label "shoe-shop." In cases where the AlexNet-ImageNet model defines the source domain $\mathbb{N}$, there are multiple labels (for example, "shoe, "loafer shoe" and "sport shoe").

In certain embodiments, adaptation layer 310 addresses situations where $\mathbb{L} \subset \mathbb{N}$ by performing transfer learning.

According to some embodiments, the feature extracting, or convolutional layers (for example, layer 325b) of pretrained deep learning model 320 are kept "frozen" by setting the learning rate for those layers to zero. Additionally, a last fully connected layer of the model is initiated with random weights and then trained on an additional data set labeled according to classifiers in the space $\mathbb{L}$. According to such embodiments, the previously trained feature extractors of the pretrained model are retained, while the final fully connected layers extend the model to cover the entirety of space $\mathbb{L}$. According to some embodiments, such model extension allows for training a deep learning model using a limited amount of training data, while at the same, avoids overfitting. According to certain embodiments, besides utilizing the learning rate and structure of output layer 325d, other network hyper-parameters are taken from the base model 320. In one exemplary embodiment, a Rectified Linear Unit (ReLU) function is used as the activation function in each convolution layer interleaved with pooling layers.

According to certain embodiments, third layer 315 of pipeline 300 comprises an ensemble output layer. The accuracy with which pipeline 300 predicts contextual labels for input data can, in certain embodiments, be enhanced by performing ensemble modeling of the outputs deep learning models 305 as adapted by adaptation layer 310. In some embodiments, performing ensemble modeling comprises determining a weighted average of the prediction probabilities of each of the pretrained models in first layer 305, as adapted or extended in second layer 310.

According to certain other embodiments, third layer 315 of pipeline 300 further comprises aggregating the ensemble output from one or more pretrained deep learning models. For example, in certain embodiments, instead of running a single image from a location k, through pipeline 300, a set of images from location k (represented as $\Gamma_k$) are sent through labeling pipeline 300. In such embodiments, the predictions for each image i in $\Gamma_k$ may be aggregated by applying the function:

$$P_\Gamma(y=l \mid \Gamma_k) = \frac{1}{|\Gamma_k|} \sum_{X_i^k \in \Gamma_k} P_I(y=j \mid X_i^k)$$

Wherein $P_I(y=j|X_i^k)$ is the prediction probability result by our ensemble of deep neural network models for classifying an image i obtained (for example, by a crowd-worker device) at location k, represented by feature vector $X_i^k$. As noted above, $\Gamma_k$ is the set of all images obtained at location k, and $P_\Gamma(y=l|\Gamma_k)$ is an aggregated prediction of the probability of label y across all images for location k.

According to certain embodiments, once the aggregated probability of each label y across all images in $\Gamma_k$ has been determined, a final label for each location k may be obtained by selecting the label with the maximum aggregated probability. In one exemplary embodiment, the final label "$label_k$" may be selected by applying the function:

$$label_k = \mathrm{argmax}_l P_\Gamma(y=l \mid \Gamma_k)$$

FIG. 4 illustrates operations of an exemplary method 400 for performing adaptation of pretrained deep learning models to obtain an ensemble output according to this disclosure.

As discussed elsewhere in this disclosure, method 400 may be practiced across a variety of apparatus and networking contexts. In some embodiments, operations of method 400 may be practiced on a single chip in a single apparatus. According to other embodiments, the operations of method 400 may be practiced across multiple machines, such as a network of machines embodying a server-client paradigm.

In the non-limiting example of FIG. 4, method 400 is described with reference to providing an ensemble output of contextual labels based on image data. However, the present disclosure is not so limited, and method 400 may be equally well applied to types of data containing contextual signals other than image data.

According to certain embodiments, method 400 includes operation 405 wherein an apparatus (as one non-limiting example, apparatus 100 in FIG. 1) implementing a processing pipeline (for example, pipeline 300 in FIG. 3) receives one or more pretrained deep learning models, each model associated with a source domain. As used herein, the term "source domain" encompasses descriptions of a "source domain" from the perspective of an adaptation layer (for example, adaptation layer 310 in FIG. 3). For example, in some embodiments, at operation 405, an apparatus may receive AlexNet, which outputs one thousand classification labels. From the perspective of an adaptation layer, the one thousand classification labels define a source domain for the model. Similarly, from the perspective of the adaptation layer, the full set of contextual labels associated with possible outputs of method 400 comprise a target domain.

In some embodiments, method 400 includes operation 410, wherein the apparatus receives one or more items of image data to be contextually labeled. In some embodiments, the image data may be received from a single source (for example, a camera on the apparatus implementing the processing pipeline). In other embodiments, the image data may be received from a plurality of sources (for example, crowd workers 225a-225c in FIG. 2).

In the non-limiting example of FIG. 4, at operation 415, the received image data is input into each of the one or more pretrained deep learning models, thereby starting the process of passing the image data through the layers of the model to identify deep features within the data and calculating the probability of labels in the source domain matching the identified features.

According to some embodiments, method 400 includes operation 420, wherein the apparatus performs adaptation on each of the pretrained deep learning models. According to some embodiments, such as where the label space $\mathbb{L}$ of the target domain is a subset of the label space $\mathbb{N}$ for the target domain, (e.g., where $\mathbb{L} \subset \mathbb{N}$), adaptation may, as discussed elsewhere in this disclosure, be performed by applying a Boolean filter to disregard labels in $\mathbb{N}$ which are not in $\mathbb{L}$. In some embodiments, adaptation may be performed at operation 420 by applying the function:

$$P_s(y=j \mid X_i) = \frac{1(y \in \mathbb{L}) \cdot P(y=j \mid X_i)}{\sum_{\mathbb{L}} 1(y \in \mathbb{L}) \cdot P(y=j \mid X_i)}$$

In at least one embodiment, $\mathbb{L} \subset \mathbb{N}$ and at operation 425, the apparatus performs transfer learning on each of the pretrained deep learning models which do not satisfy the condition $\mathbb{L} \subset \mathbb{N}$. According to certain embodiments, performing transfer learning comprises "freezing" the feature extracting, or convolutional layers, of the pretrained deep learning model 320 by setting the learning rate for those layers to zero. Additionally, a last fully connected layer of the model is initiated with random weights and then trained on an additional data set labeled according to classifiers in the space $\mathbb{L}$. According to such embodiments, the previously trained feature extractors of the pretrained model are retained, while the final fully connected layers extend the model to cover the entirety of space $\mathbb{L}$.

In certain embodiments, method 400 includes operation 430 wherein a result in the target domain is obtained from each of the adapted pretrained deep learning models.

According to some embodiments, at operation 435, the apparatus provides an ensemble output, wherein the ensemble output comprises a weighted average of prediction probabilities for labels in the target domain based on the outputs from each of the adapted deep learning models. In the non-limiting example of FIG. 4, the weighting of outputs may be adjusted based on a confidence or uncertainty metric determined for each of the adapted pretrained models.

FIG. 5 illustrates operations of a method 500 for performing a deep-learning based, crowd-assisted system for location labeling according to this disclosure.

While the non-limiting example of FIG. 5 describes one embodiment wherein all of the operations of method 500 are performed on a single apparatus (for example, a smartphone or back-end server computer), the present disclosure is not so limited.

According to certain embodiments, method 500 includes operation 505 wherein an apparatus receives from a user terminal, a control input associated with an intent. In certain embodiments, the apparatus is the user terminal. In other embodiments, the apparatus may be a different computing platform, such as, for example a back-end server connected via a network (for example, the internet) to the user terminal. The control input may be received as a typed command, a gesture, or a verbal utterance associated with an execution option which can be performed by a processor of the user terminal. The intent associated with the control input, may in some embodiments, understood, or better understood with some awareness of the context of the user terminal. As one non-limiting example, a person may provide as a user input to her user terminal, the spoken query "What's the status of my order?" The user may also have installed a number of applications on her user terminal which provide order-related execution options (for example, a retail shopping application, and an application associated with a coffee shop). In this example, the probability of selecting the execution option (for example, opening the retail application or opening the coffee shop application) associated with the control input is improved with an awareness of the context of the user terminal. If the user terminal can determine that it its current location is likely a coffee shop, the coffee shop application is likely the correct execution option.

In some embodiments, at operation 510, the apparatus obtains location data associated with the location of the user terminal. Location data includes, without limitation, image data, network connectivity data (for example, an identification of active Wi-Fi hotspots at a given location) and GPS data. In this particular example, the term "location of the user terminal" encompasses the physical location of a user terminal (for example, a smartphone) as a source of contextual signals as to the user's intent. As discussed above, the knowledge that the user's smartphone is in a coffee shop provides a contextual signal that opening the coffee shop application is likely the execution option best aligned with the intent of the user's control input. However, the present disclosure is not so limited, and method 500 is equally operable where the "location of the user terminal" is a location in virtual, abstract or other non-terrestrial space. For example, a "location of the user terminal" may, for example, refer to the user's location in a graph of a social network. In such cases, the user's location in the graph of the social network may provide contextual signals as to the execution option best matching the intent of the user's control input. For example, if the user input is a spoken request to "Play me a good movie," knowledge of the user's neighbors in a graph of a social network may provide context in selecting a movie to play on the user terminal.

In various embodiments, at operation 515, the user terminal determines a scored set of execution options associated with the control input. Returning to the example of an apparatus receiving "what's the status of my order?" as a control input, at operation 515, the apparatus determines "open coffee shop application" and "open retail shopping application" as members of the scored set of execution options associated with the control input.

In the non-limiting example of FIG. 5, at operation 520, the apparatus obtains a contextual label associated with the location data, wherein the label is determined based on the application of one or more adapted deep learning models to image data associated with the location. According to certain embodiments, the contextual model is obtained by inputting the location data (in this case, image data associated with the location of the user terminal) into a processing pipeline (for example, pipeline 300 in FIG. 3) implemented on the apparatus. Further, the pipeline comprises one or more adapted, pretrained deep learning models. In this example, one or more of the pretrained deep learning models has been adapted by performing model extension using image data obtained by crowd worker devices communicatively connected to the device. Further, in this non-limiting example, at least one of the pretrained deep learning models in the pipeline implemented at the apparatus is a lightweight, mobile-adapted version of a deep learning model.

Because deep learning models can be both computationally expensive and take up a lot of storage space, implementing such models on smartphones or other portable apparatus without rapidly draining batteries or consuming storage resources required for important user content (for example, photos, video and audio data) can present a technical challenge. In certain embodiments, the demands on the limited resources of mobile apparatus can be mitigated by "shrinking" the file size of the model by applying a quantization method which takes advantage of the weights format of a trained model. Such "shrinking" can be attained by, for example, quantizing each 32 bit floating value in a model's weight matrices to the closest (8 bit) integer number, resulting in an approximately 75% reduction in file size.

According to certain embodiments, at operation 525, the apparatus rescores the execution options in the set of execution options based on the contextual label obtained in operation 520. In one non-limiting example, the contextual label associated with the location data was "coffee shop," thereby raising the score for the execution option "open coffee shop application."

In the non-limiting example of FIG. 5, at operation 530, the apparatus identifies, from the rescored execution options, the highest scored execution option and provides the highest scored execution option to a processor of the user terminal.

Figure 7C:
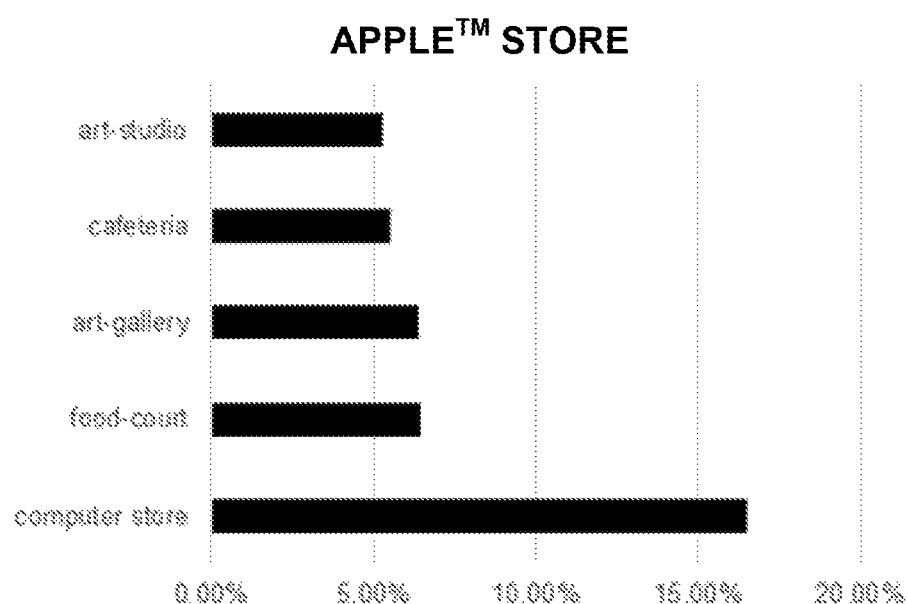

FIG. 6 illustrates, in tabular format, aspects of a pipeline of deep learning models for generating an ensemble output according to this disclosure. The table in FIG. 6 is based on a set of deep learning models trained and adapted to provide an ensemble output predicting a contextual label associated with image data taken from retail locations in a shopping mall. The performance results of the pipeline of deep learning models shown in FIG. 6 are shown in FIG. 7 herein.

In the particular example of FIG. 6, the pipeline was developed based on eight separate deep learning models (shown as Models 1-8 in the column titled "DNN Model").

As shown in the column titled "Architecture," Models 1-8 varied structurally, with regard to the number of convolution and fully connected layers, and with regard to the number of elements in the source domain, which ranged from 9 classes for "Model 8" to 1183 classes for "Model 3." In this particular example, the target domain comprised 26 labels corresponding to, inter alia, different retail contexts (for example, "shoe-store" and "supermarket").

As shown in the column titled "Data Set," Models 1-8 were generally trained on large data sets having more classes than the 26 labels in the target domain. For models whose source domain, N, did not cover all of the 26 classes in the target domain, L, adaptation by transfer learning was performed, as shown by the "→" icon in the "Data Set" column.

FIG. 7 illustrates, in five plots, performance data from a real-world test of the pipeline of deep learning models described with reference to FIG. 6. The test data shown in FIG. 7 is drawn from a test wherein the pipeline of pretrained deep learning models was implemented on a smartphone, and the ensemble outputs of the pipeline were aggregated on predictions on crowd-sourced images. In each plot in FIG. 7, the name of a store is specified (for example, "Safeway™") and the pairings of probabilities and contextual labels (such as contextual label 705) for the top five predictions produced by the pipeline are shown in the plots. For example, for image data collected at a "Safeway™," supermarket, the pipeline determined that there was a 68.52% probability of "supermarket" being the correct contextual label for the image data.

FIG. 8 illustrates operations of a method 800 for generating a location-device matrix according to certain embodiments of this disclosure. In the non-limiting example of FIG. 8, a location-device matrix provides a probabilistic representation of a scene, or location corresponding to a context (for example, a "shoe store," a "supermarket" or a "living room") based on the application of convolutional neural networks or deep learning networks to image data from the location to identify devices within the location. According to certain embodiments, the location-device matrix serves as an input to a rescoring algorithm for rescoring execution options based on contextual labeling.

According to certain embodiments, method 800 includes operation 805 wherein an apparatus (for example, apparatus 100 in FIG. 1) parses image data associated with the location (for example, an image captured at the location) using a deep learning neural model. In some embodiments, the deep learning model is a convolutional neural network (CNN). In other embodiments, the deep learning model is a deep neural network (DNN).

In some embodiments, parsing image data at operation 805 comprises identifying features corresponding to devices (for example, legs, bases and other constituent parts of devices and objects in the scene). From the identified devices, a vector representing objects in the scene (for example, chairs, toasters and t.v. screens) can be compiled.

In the non-limiting example of FIG. 8, at operation 810, one or more of the deep learning models (for example a convolutional neural network) is adapted, so that all of its outputs belong to a target domain. According to some embodiments, the convolutional neural network may be adapted using methods described in this disclosure (for example, the methods described with reference to operation 420 in FIG. 4).

In some embodiments, if the target domain is not completely covered by the source domain associated with one or more convolutional neural networks, transfer learning is performed at operation 815. In the non-limiting example of FIG. 8, transfer learning may be performed using methods described in this disclosure (for example, the methods described with reference to operation 425 in FIG. 4).

According to various embodiments, at operation 820, the deep learning models (in this non-limiting example, the convolutional neural networks) provide an output in the source domain. Depending on embodiments, the output provided at operation 820 may be an output from a single item of image data. In other embodiments, the output provided at operation 820 may be an aggregated output based on multiple pieces of image data from the location.

In some embodiments, the output in the target domain includes location attention vector 825. In the non-limiting example of FIG. 8, location attention vector 825 comprises the probabilities of various contextual location labels (for example, a "shoe store," a "supermarket" or a "living room") associated with the image data. As illustrated in FIG. 8, the various contextual location labels are shown with different fill patterns. Thus, in this particular example, the upward diagonal fill pattern indicates the probability that the image corresponds to, the contextual location label "supermarket," while horizontal lines correspond to the probability that the image corresponds to the contextual location label "shoe store."

According to certain embodiments at operation 830, a bipartite graph mapping locations to devices is updated based on the output of operation 820. In some embodiments, the bipartite graph comprises a mapping of the edges between members of a set of contextual location labels and devices. Further, according to some embodiments, each edge between labels and devices is assigned a weighting based on the determined correspondence between the contextual label and the device. Thus, at operation 830, the edge weightings of the bipartite graph are updated based on the output of operation 820.

In the non-limiting example of FIG. 8, at operation 835, the apparatus builds location-device matrix 840 based on the bipartite graph updated at operation 830. In the non-limiting example of FIG. 8, row of the location-device matrix comprises the weighting values associated between contextual location labels (for example "supermarket") and devices (for example, "toasters" or "tables") parsed from image data associated with the location.

According to some embodiments, the output of operation 835 comprises location-device matrix 840. As with location attention vector 825, upward diagonal cross-hatching is used to show entries of location-device matrix 840 associated with the contextual location label "supermarket."

FIG. 9 illustrates aspects of building a location-device matrix 900 based on a bipartite graph according to certain embodiments of this disclosure.

According to certain embodiments, an apparatus (for example apparatus 100 in FIG. 1) implementing methods according to this disclosure maintains and updates a bipartite graph 905 of contextual labels and deep features parsed from a contextual signal-rich source of data. In the non-limiting example of FIG. 9, contextual labels comprise contextual location labels 910*a* and 910*b*. Further, in this particular example, the parsed features comprise devices 915*a*, 915*b* and 915c recognized from image data through the application of one or more convolutional neural networks.

As shown in FIG. 9, in bipartite graph 905, edges between each element of the set of contextual location labels and each element of the set of devices are determined. Further, as shown with respect to edge 920, each edge is associated with a weight quantifying the correspondence between a device and a contextual label. In this non-limiting example, edge 920 connecting contextual label $l_2$ to device $d_3$ is shown as having a weighting value of −0.9, indicating a negative correspondence between a device and a contextual location label. In this example, a large negative weighting value indicates that the presence of a particular device (for example, "basketball hoop") corresponds to a particular contextual location label (for example, "supermarket").

As shown in the non-limiting example of FIG. 9, each of the weighting values of edges between elements of a set of contextual labels and elements of a set of features become values of the location-device matrix 900. As shown by matrices 900 and 925, rows of the location-device matrix the weightings between devices and a particular contextual label. For example, in location-device matrix 925, the row shown with a diagonal fill corresponds to the contextual location label "supermarket." According to some embodiments, the output of operation 835 comprises location-device matrix 840.

FIG. 9 illustrates aspects of building a location-device matrix 900 based on a bipartite graph according to certain embodiments of this disclosure.

According to certain embodiments, an apparatus (for example apparatus 100 in FIG. 1) implementing methods according to this disclosure maintains and updates a bipartite graph 905 of contextual labels and deep features parsed from a contextual signal-rich source of data. In the non-limiting example of FIG. 9, contextual labels comprise contextual location labels 910a and 910b. Further, in this particular example, the parsed features comprise devices 915a, 915b and 915c recognized from image data through the application of one or more convolutional neural networks.

As shown in FIG. 9, in bipartite graph 905, edges between each element of the set of contextual location labels and each element of the set of devices are determined. Further, as shown with respect to edge 920, each edge is associated with a weight quantifying the correspondence between a device and a contextual label. In this non-limiting example, edge 920 connecting contextual label $l_2$ to device $d_3$ is shown as having a weighting value of −0.9, indicating a negative correspondence between a device and a contextual location label. In this example, a large negative weighting value indicates that the presence of a particular device (for example, "basketball hoop") corresponds to a particular contextual location label (for example, "supermarket").

As shown in the non-limiting example of FIG. 9, each of the weighting values of edges between elements of a set of contextual labels and elements of a set of features become values of the location-device matrix 900. As shown by matrices 900 and 925, rows of the location-device matrix the weightings between devices and a particular contextual label.

FIG. 10 illustrates aspects of an algorithm 1000 for rescoring execution options according to certain embodiments of this disclosure.

In the non-limiting example of FIG. 10, the inputs of algorithm 1000 for rescoring execution options based on contextual location labels comprise initial intelligent assistant determination 1005, attention vector 1010, location-intention matrix 1015, location-device matrix 1020, and device capability matrix 1025.

According to certain embodiments, initial intelligent assistant determination 1005 determination 1005 comprises a vector of probabilities mapped to execution options of devices at a user's location, as initially determined by an intelligent assistant (for example AI service 220) based on the intelligent assistant's analysis of the user's intention from a control input, without regard to any contextual labeling. In the non-limiting example of FIG. 10, the vector comprising initial intelligent assistant determination 1005 may be represented in matrix form as $u_{u*1}$.

As a simple example, a user provides the spoken input "What's the status of my order?" The possible execution options associated with the user input include "open coffee shop application" and "open retail shopping application." According to some embodiments, initial intelligent assistant determination 1005 may comprise a vector having values of 0.3 for the execution options "open coffee shop application" and "open retail shopping application." In this example values of the vector are probabilistic scores as to whether an execution option correctly aligns with the user's intention. In this particular example, the apparatus is able to determine that both of these options are likely, but does not have any contextual information to prefer the coffee shop application over the retail shopping application.

In some embodiments, attention vector 1010 comprises, an ensemble output of a pipeline (for example, pipeline 300 in FIG. 3) into which image data from a location i, has been inputted. According to some embodiments, attention vector 1010 comprises an aggregation of ensemble outputs for multiple pieces of image data from location i. The constituent members of attention vector 1010 are the probabilities, that image data from location i is associated with a particular contextual label j. In the non-limiting example of FIG. 10, $a_{ij}$ is represented as $P(Location_i \backslash Input\ Image_x)$.

According to various embodiments, location-intention matrix 1015 comprises a matrix of probabilities of execution options (or user intentions) across contextual location labels. In the non-limiting example of FIG. 10, the constituent entries $Q_{ij}$ of location-intention matrix 1015 may be represented as $P(Intention_i \backslash Location_j)$.

In the non-limiting example of FIG. 10, location-device matrix 1020 comprises a location-device matrix (for example, location-device matrices 900 and 925 in FIG. 9). In the non-limiting example of FIG. 10, the constituent elements $M_{ij}$ of location-device matrix 1020 may be represented as $P(Device_i \backslash Location_j)$.

According to certain embodiments, device capability matrix 1025 comprises a mapping of probabilities that a device obtained by parsing image data for a location i is associated with a particular execution option or user intent. In the non-limiting example of FIG. 10, the constituent members $R_{ij}$ of device capability matrix 1025 may be represented as $P(Intention_i \backslash Device_j)$.

According to certain embodiments, the scores comprising vector $u_{u*1}$ comprising initial intelligent assistant determination 1005 can be recalculated, or "rescored" by applying the function R(u) as shown below:

$$R(u) = [Q.\text{conc}(a)]^T \cdot M^T \cdot Y^T \cdot u$$

Wherein $M^T$ is the transpose of location-device matrix 1020), $[Q.\text{conc}(a)]^T$ is the transpose of the dot product of the user-intention location matrix Q, and the concatenation of location attention vector a 1010, and $Y^T$ is the transpose of device-capability matrix 1025.

Application of R(u) results in the vector 1030, which is a vector in the same space as initial intelligent assistant determination 1005, but in which the constituent probabilities of user intentions are rescored based on contextual information provided by, without limitation, location-device matrix 1020.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus for labeling of image data, the apparatus comprising:
  a processor; and
  a memory containing instructions that, when executed by the processor, cause the apparatus to:
    receive one or more pretrained deep learning models, each pretrained deep learning model associated with a source domain,
    receive image data to be labeled,
    input the received image data to each of the one or more pretrained deep learning models,
    perform a model adaptation on at least one of the one or more pretrained deep learning models,
    provide, from each of the one or more pretrained deep learning models, one or more outputs in a target domain,
    provide an ensemble output, the ensemble output comprising labels for the image data determined based on the one or more outputs from each of the one or more pretrained deep learning models, and
    when the target domain is not completely covered by the source domain associated with one or more specified pretrained deep learning models of the one or more pretrained deep learning models, perform transfer learning on the one or more specified pretrained deep learning models,
  wherein the instructions that when executed cause the apparatus to perform the transfer learning comprise instructions that when executed cause the apparatus to train a final layer of each of the one or more specified pretrained deep learning models, and
  wherein, during the training of the final layer of each of the one or more specified pretrained deep learning models, (i) a learning rate for one or more convolutional layers of the specified pretrained deep learning model is set to zero and (ii) learned parameters assigned to feature vectors of the specified pretrained deep learning model are not tuned.

2. The apparatus of claim 1, wherein the instructions that when executed cause the apparatus to perform the model adaptation comprise instructions that when executed cause the apparatus to apply a function of:

$$P_s(y=j|X_i) = \frac{1(y \in \mathbb{L}) \cdot P(y=j|X_i)}{\sum_\mathbb{L} 1(y \in \mathbb{L}) \cdot P(y=j|X_i)}$$

where $1(\bullet)$ is an identity function, and $\mathbb{L}$ is a label-set defining the target domain.

3. The apparatus of claim 1, wherein:
  the memory further contains instructions that, when executed by the processor, cause the apparatus to aggregate the ensemble output; and
  the instructions that when executed cause the apparatus to aggregate the ensemble output comprise instructions that when executed cause the apparatus to apply a function of:

$$P_\Gamma(y=l|\Gamma_k) = \frac{1}{|\Gamma_k|} \sum_{X_i^k \in \Gamma_k} P_I(y=j|X_i^k)$$

where $P_I(y=j|X_i^k)$ is a prediction probability result for the ensemble output for classifying an image i obtained at a location k as represented by a feature vector $X_i^k$, and $P_\Gamma(y=l|\Gamma_k)$ is an aggregated prediction of a probability of a label y across all inputs for the location k.

4. The apparatus of claim 3, wherein:
  the memory further contains instructions that, when executed by the processor, cause the apparatus to label image data for the location k; and
  the instructions that when executed cause the apparatus to label the image data comprise instructions that when executed cause the apparatus to apply a function of:

$$label_k = \mathrm{argmax}_l P_\Gamma(y=l|\Gamma_k)$$

where $label_k$ is a final label with a maximum aggregated probability.

5. A method for labeling of image data, the method comprising:
  receiving, at an apparatus implementing a processing pipeline, one or more pretrained deep learning models, each pretrained deep learning model associated with a source domain;
  receiving image data to be labeled;
  inputting the received image data to each of the one or more pretrained deep learning models;
  performing a model adaptation on at least one of the one or more pretrained deep learning models;
  providing, from each of the one or more pretrained deep learning models, one or more outputs in a target domain;
  providing an ensemble output, the ensemble output comprising labels for the image data determined based on the one or more outputs from each of the one or more pretrained deep learning models; and
  when the target domain is not completely covered by the source domain associated with one or more specified pretrained deep learning models of the one or more pretrained deep learning models, performing transfer learning on the one or more specified pretrained deep learning models;
  wherein performing the transfer learning comprises training a final layer of each of the one or more specified pretrained deep learning models; and
  wherein, during the training of the final layer of each of the one or more specified pretrained deep learning models, (i) a learning rate for one or more convolutional layers of the specified pretrained deep learning model is set to zero and (ii) learned parameters assigned to feature vectors of the specified pretrained deep learning model are not tuned.

6. The method of claim 5, wherein performing the model adaptation comprises applying a function of:

$$P_s(y=j|X_i) = \frac{1(y \in \mathbb{L}) \cdot P(y=j|X_i)}{\sum_{\mathbb{L}} 1(y \in \mathbb{L}) \cdot P(y=j|X_i)}$$

where $1(\bullet)$ is an identity function, and $\mathbb{L}$ is a label-set defining the target domain.

7. The method of claim 5, further comprising:
aggregating the ensemble output by applying a function of:

$$P_\Gamma(y=l|\Gamma_k) = \frac{1}{|\Gamma_k|} \sum_{X_i^k \in \Gamma_k} P_I(y=j|X_i^k)$$

where $P_I(y=j|X_i^k)$ is a prediction probability result for the ensemble output for classifying an image i obtained at a location k as represented by a feature vector $X_i^k$, and $P_\Gamma(y=l|\Gamma_k)$ is an aggregated prediction of a probability of a label y across all inputs for the location k.

8. The method of claim 7, further comprising:
labeling image data for the location k by applying a function of:

$$label_k = \underset{l}{\operatorname{argmax}} P_\Gamma(y=l|\Gamma_k)$$

where $label_k$ is a final label with a maximum aggregated probability.

9. The method of claim 5, further comprising:
updating a bipartite graph of elements of the target domain at one or more crowd-worker devices.

10. A non-transitory computer-readable medium including program code that, when executed by a processor, causes an apparatus to:
receive one or more pretrained deep learning models, each pretrained deep learning model associated with a source domain,
receive image data to be labeled,
input the received image data to each of the one or more pretrained deep learning models,
perform a model adaptation on at least one of the one or more pretrained deep learning models,
provide, from each of the one or more pretrained deep learning models, one or more outputs in a target domain,
provide an ensemble output, the ensemble output comprising labels for the image data determined based on the one or more outputs from each of the one or more pretrained deep learning models, and
when the target domain is not completely covered by the source domain associated with one or more specified pretrained deep learning models of the one or more pretrained deep learning models, perform transfer learning on the one or more specified pretrained deep learning models,
wherein the program code that when executed causes the apparatus to perform the transfer learning comprises program code that when executed causes the apparatus to train a final layer of each of the one or more specified pretrained deep learning models, and
wherein, during the training of the final layer of each of the one or more specified pretrained deep learning models, (i) a learning rate for one or more convolutional layers of the specified pretrained deep learning model is set to zero and (ii) learned parameters assigned to feature vectors of the specified pretrained deep learning model are not tuned.

11. The non-transitory computer-readable medium of claim 10, wherein the program code that when executed causes the apparatus to perform the model adaptation comprises program code that when executed causes the apparatus to apply a function of:

$$P_s(y=j|X_i) = \frac{1(y \in \mathbb{L}) \cdot P(y=j|X_i)}{\sum_{\mathbb{L}} 1(y \in \mathbb{L}) \cdot P(y=j|X_i)}$$

where $1(\bullet)$ is an identity function, and $\mathbb{L}$ is a label-set defining the target domain.

12. The non-transitory computer-readable medium of claim 10, further including program code that, when executed by the processor, causes the apparatus to aggregate the ensemble output;
wherein the program code that when executed causes the apparatus to aggregate the ensemble output comprises program code that when executed causes the apparatus to apply a function of:

$$P_\Gamma(y=l|\Gamma_k) = \frac{1}{|\Gamma_k|} \sum_{X_i^k \in \Gamma_k} P_I(y=j|X_i^k)$$

where $P_I(y=j|X_i^k)$ is a prediction probability result for the ensemble output for classifying an image i obtained at a location k as represented by a feature vector $X_i^k$, and $P_\Gamma(y=l|\Gamma_k)$ is an aggregated prediction of a probability of a label y across all inputs for the location k.

13. The non-transitory computer-readable medium of claim 12, further including program code that, when executed by the processor, causes the apparatus to label image data for the location k;
wherein the program code that when executed causes the apparatus to label the image data comprises program code that when executed causes the apparatus to apply a function of:

$$label_k = \underset{l}{\operatorname{argmax}} P_\Gamma(y=l|\Gamma_k)$$

where $label_k$ is a final label with a maximum aggregated probability.

14. The non-transitory computer-readable medium of claim 10, further including program code that, when executed by the processor, causes the apparatus to update a bipartite graph of elements of the target domain at one or more crowd-worker devices.

15. An apparatus comprising:
a processor; and
a memory containing instructions that, when executed by the processor, cause the apparatus to:
receive, from a user terminal, a control input associated with an intent, obtain location data associated with a location of the user terminal, determine a scored set of execution options associated with the control input, obtain a contextual label associated with the location data, the contextual label determined based on an application of one or more adapted pretrained deep learning models to the location data, the one or more adapted pretrained deep learning models comprising one or more convolutional layers and a final fully-connected layer trained on a data set containing classifiers of a target domain of execution options, wherein the convolutional layers comprise one or more learned parameters assigned to feature vectors that are not tuned during adaptation, rescore the scored set of execution options associated with the control input based on the contextual label, and provide a highest-scored execution option to a processor of the user terminal.

16. A method comprising:

receiving, at an apparatus implementing a processing pipeline from a user terminal, a control input associated with an intent, obtaining location data associated with a location of the user terminal, determining a scored set of execution options associated with the control input, obtaining a contextual label associated with the location data, the contextual label determined based on an application of one or more adapted pretrained deep learning models to the location data, the one or more adapted pretrained deep learning models comprising one or more convolutional layers and a final fully-connected layer trained on a data set containing classifiers of a target domain of execution options, wherein the convolutional layers comprise one or more learned parameters assigned to feature vectors that are not tuned during adaptation, rescoring the scored set of execution options associated with the control input based on the contextual label, and providing a highest-scored execution option to a processor of the user terminal.

17. A non-transitory computer-readable medium including program code that, when executed by a processor, causes an apparatus to:

receive, from a user terminal, a control input associated with an intent, obtain location data associated with a location of the user terminal, determine a scored set of execution options associated with the control input, obtain a contextual label associated with the location data, the contextual label determined based on an application of one or more adapted pretrained deep learning models to the location data, the one or more adapted pretrained deep learning models comprising one or more convolutional layers and a final fully-connected layer trained on a data set containing classifiers of a target domain of execution options, wherein the convolutional layers comprise one or more learned parameters assigned to feature vectors that are not tuned during adaptation, rescore the scored set of execution options associated with the control input based on the contextual label, and provide a highest-scored execution option to a processor of the user terminal.

18. The apparatus of claim 15, wherein, in at least one adapted pretrained deep learning model of the one or more adapted pretrained deep learning models, values of one or more weight matrices are quantized as integer values.

19. The method of claim 16, wherein, in at least one adapted pretrained deep learning model of the one or more adapted pretrained deep learning models, values of one or more weight matrices are quantized as integer values.

20. The non-transitory computer-readable medium of claim 17, wherein, in at least one adapted pretrained deep learning model of the one or more adapted pretrained deep learning models, values of one or more weight matrices are quantized as integer values.

* * * * *